H. KOCOUREK.
SPRING WINDING ELECTRIC MOTOR.
APPLICATION FILED FEB. 3, 1917.
1,266,280.
Patented May 14, 1918.
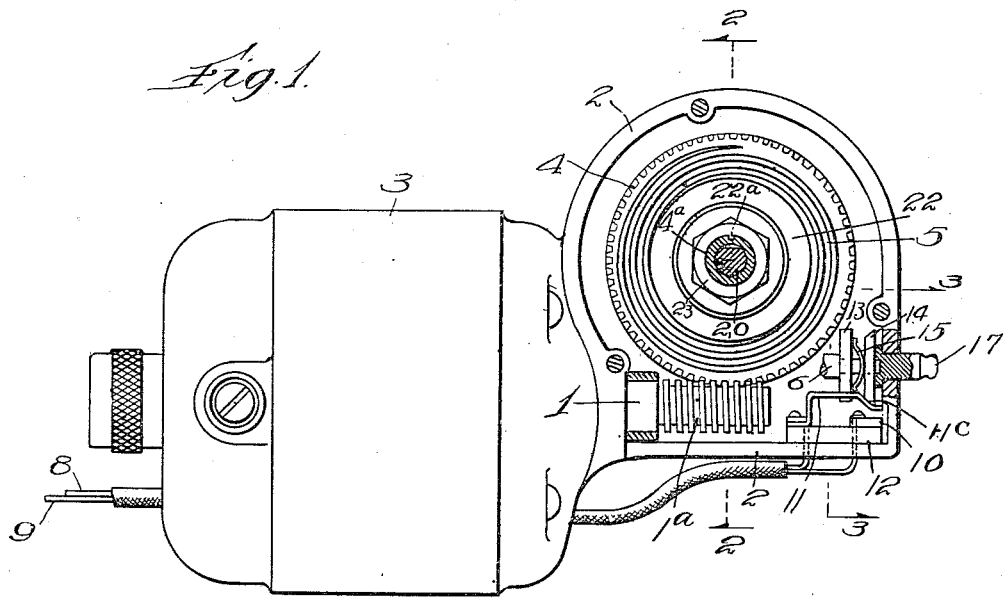
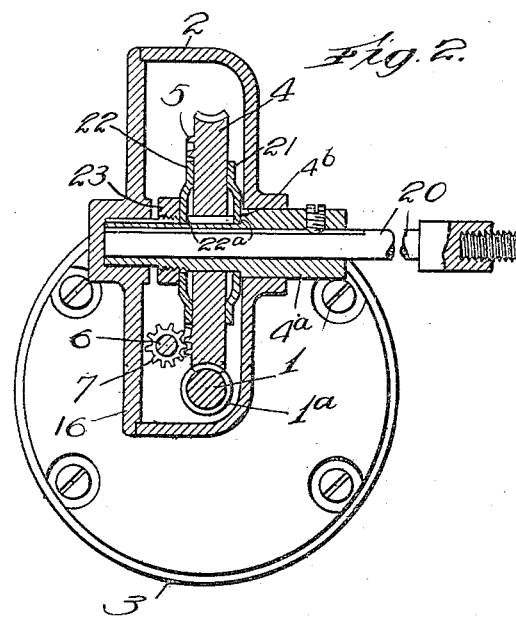
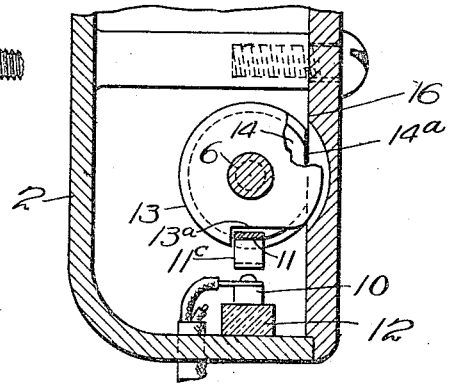
Inventor:
Henry Kocourek,
by Burton & Burton
his Attys.
Witness:

UNITED STATES PATENT OFFICE.

HENRY KOCOUREK, OF JERSEY CITY, NEW JERSEY, ASSIGNOR TO JULIA B. STEWART, EXECUTRIX OF THE WILL OF JOHN K. STEWART, DECEASED.

SPRING-WINDING ELECTRIC MOTOR.

1,266,280.    Specification of Letters Patent.    Patented May 14, 1918.

Application filed February 3, 1917. Serial No. 146,539.

*To all whom it may concern:*

Be it known that I, HENRY KOCOUREK, a citizen of the United States, residing at Jersey City, in the county of Hudson and State of New Jersey, have invented new and useful Improvements in Spring-Winding Electric Motors, of which the following is a specification, reference being had to the accompanying drawings, forming a part thereof.

The purpose of this invention is to provide an improved electric motor particularly adapted for winding up the spring, or the like, of a spring motor, the same being designed especially for the purpose of winding the spring motors of phonographs or sound-reproducing devices. It consists in the elements and features of construction shown and described, as indicated in the claims.

In the drawings:—

Figure 1 is an axial section of an electric motor embodying this invention.

Fig. 2 is a section at the line, 2—2, on Fig. 1.

Fig. 3 is a section at the line, 3—3, on Fig. 1.

The electric motor shown in the drawings is of familiar construction as to the field, armature and winding and circuit connections of both field and armature, said customary parts being represented in familiar or conventional form requiring no specific description. The armature shaft, 1, extends into a casing, 2, mounted or built upon one end of the main motor casing, 3, said casing, 2, being for inclosing a speed-reducing train which comprises a worm, 1$^a$, upon the armature shaft, 1, meshing with a worm gear 4, journaled on a shaft, 4$^a$ in the casing, 2, and extending in alinement with,—and as here shown extending out through,—an aperture in one side wall of said casing, 2 and having upon one face a helical thread or gear element, 5, which meshes with a pinion, 7, on a shaft, 6, parallel to the armature shaft. The motor-energizing circuit wires, 8 and 9, extend into the casing, 3, and are connected with contact pieces, 10 and 11, mounted upon an insulating block, 12, the contact piece, 11, being a spring contact adapted to be forced into contact with the piece, 10, for closing the circuit and to react out of contact therewith. The contact-making arm of said contact piece, 11, extends in general parallel with the shaft, 6, which is on the opposite side of said contact piece, 11, from the contact piece, 10. On the shaft, 6, there are two cams, both of fiber or other insulating material, one of the cams, 13, is mounted for rotation with the shaft, 6, and is circular except as to a peripheral notch or recess, 13$^a$, which has one shoulder abrupt and the other sloping, so that as the cam rotates with the shaft, 6, the spring contact piece, 11, at one position in the rotation of the cam rests in the recess or notch and is out of contact with the contact piece, 10, while during the remainder of the rotation of the contact piece it first, as a cam, crowds the spring-contact piece, 11, into contact with the piece, 10, closing the circuit, and during the remainder of the operation until the notch again comes around to said spring-contact piece, holds the two contact pieces in contact, maintaining the circuit closed. The other cam, 14, is mounted for longitudinal movement along the shaft and preferably, though not necessarily, it is loose on the shaft as to rotation so that it is not rotated by said shaft, 6. As illustrated, it is positively prevented from thus rotating by having a small segment cut away at one side as seen at 14$^a$, making a flat portion which seats against the cover, 16, of the casing, 2. This cam, 14, has one edge beveled engaging the slopingly bent end portion, 11$^c$, of the contact piece, 11, so that when said cam, 14, is forced inward along the shaft, 6, the engagement of said beveled edge of said cam with the sloping end portion of the contact piece, 11, forces the latter into contact with the piece, 10, and closes the circuit. The elastic reaction of the contact piece, 11, tends to force the cam, 14, out along the shaft, permitting the necessary reaction for movement out of contact of the contact pieces, 11 and 10; but more perfectly to insure this reaction there is interposed between the cams, 13 and 14, on the shaft, 6, a spring, 15, which insures said reacting movement. There is mounted in the end wall of the casing, 2, a circuit-breaking push button, 17, which may be conveniently centered on the end of the shaft, 6, but which is without engagement therewith, and which serves, by being thrust inward, for forcing the cam, 14, in the direction for forcing the contact piece, 11, into circuit-closing contact with the contact piece, 10, and holding the circuit closed as long as the operator continues to press the push-button, but ready upon release of the push-button, to react out of contact with the contact piece, 10. But it will be observed that such reaction can only occur when the recess, 13ª, of the cam, 13, is in a position to receive the contact piece, 11, in said reacting movement. The result is that when the operator has pressed the push button for establishing the contact and closing the circuit and the motor has been thereby energized, the push-button being held depressed long enough to permit the rotation of the motor to rotate the cam, 13, far enough to take the notch, 13ª, away from the contact piece, 11, the circuit will remain closed, notwithstanding the release of the push button, until the cam, 13, completes its revolution, bringing the notch again around into position to receive the contact piece, 11, which will then react back into it, opening the circuit. The device thus operates to automatically open the circuit and deënergize the motor after a certain period of operation commenced by the manual operation of the push-button.

The mode of use of the device for winding the spring motor of a phonograph, or like instrument, is that the motor is mounted upon the winding shaft of the phonograph by means of a shaft, 20, which extends through the hollow or axially apertured shaft, 4ª, of the gear, 4, with a sliding and feathered or equivalent engagement therewith so as to be movably engageable with and be rotated by said gear shaft, 4ª, said shaft, 20, being arranged to be screwed or otherwise entered into connection with the winding shaft of the motor, in whatever manner the usual winding crank is arranged to be attached to said winding shaft, the winding-up motor being then mounted on said shaft, 20, by sliding the hollow shaft, 4ª, onto said shaft, 20. When intending to operate the phonograph, the user, not knowing to what extent the phonograph motor may be wound, will depress the push button, causing the motor to be energized, and to wind the motor to the extent corresponding to one complete revolution of the cam, which, as designed in the present instrument is ten revolutions of the winding shaft. If the phonograph motor is so nearly wound up that ten revolutions or less will complete the winding, this fact will be disclosed by the stopping of the winding shaft when the phonograph motor is completely wound, and if not the operator will again depress the push button and will repeat this process until the phonograph motor is wound as tightly as the user desires. In order that the electric motor may not be stalled, and thereby become over-heated from remaining in circuit after the winding is completed as far as the electric motor can wind it, the gear, 4, is frictionally carried on its shaft, 4ª, between two spring disks, 21 and 22, at opposite sides of said gear, the disk, 21, being stopped against a shoulder, 4ᵇ, on the shaft, 4ª, and the disk, 22, being bound against the opposite side of the gear by a nut, 23, screwed onto the shaft, 4ª, and which may be screwed up to any desired degree of tightness. It will be understood that the disks, 21 and 22, are splined on the shaft so as to rotate therewith, as shown at 22ª.

I claim:—

1. In a winding motor in combination with the electric circuit in which it is energized, an armature shaft; a speed-reducing train actuated thereby; a cam actuated by said train; a contact piece actuated by the cam for closing the circuit adapted to cause the circuit to be open at a certain position in each cycle of the cam's movement; a manually-operable circuit breaker operating on the same contact piece which the cam actuates.

2. In a spring winding motor in combination with the electric circuit in which it is energized, the armature shaft; a speed-reducing train rotated thereby; a cam rotated by said train; a contact piece actuated by the cam for closing the circuit at a certain point in each revolution of the cam; a manually-operable circuit-breaker operating upon the same contact piece which the cam actuates.

3. In a spring-winding motor in combination with the circuit in which it is energized, the armature shaft; a speed-reducing train actuated thereby; two cams on a shaft of said train, one rotated thereby and the other movable therealong, the first of said cams having a peripheral recess with an abrupt shoulder at one side and a slope at the other side for permitting the circuit to be closed at a certain point in the revolution of the cam, the other cam having a beveled periphery, positioned for engaging the same contact piece which the first-mentioned cam actuates, and means for manually operating said second cam axially along the shaft.

4. In an electric winding motor in combination with the circuit in which it is energized, a rotary armature shaft, a winding train actuated by said shaft; circuit-making-and-breaking connections and circuit-controlling means in said train adapted to automatically open the circuit after a predetermined number of revolutions of the armature shaft, and a yielding frictional drive connection in the train at a point therein subsequent to the circuit-controlling means adapted to slip upon a predetermined resistance to rotation, to permit the motor to complete the number of revolutions for opening the circuit regardless of the resistance of the spring wound.

In testimony whereof, I have hereunto set my hand at Jersey City, N. J., this 29 day of January, 1917.

HENRY KOCOUREK.